Figure 1:
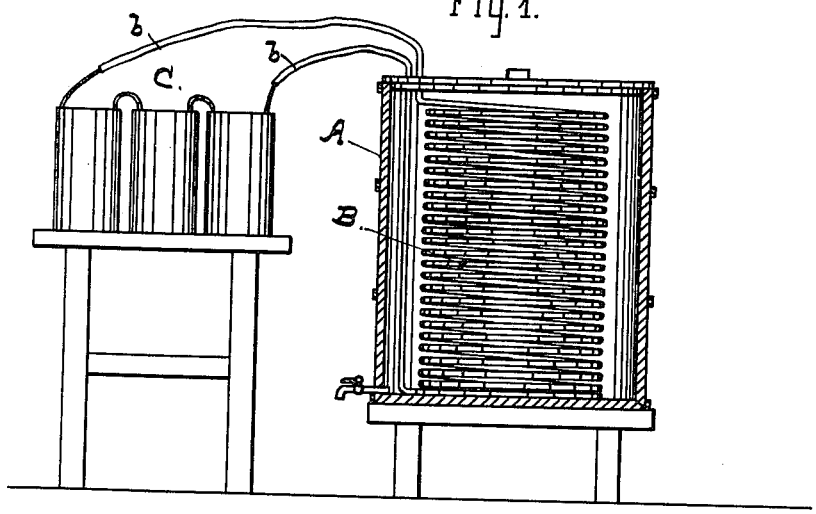

(No Model.)

E. J. FRASER.
PROCESS OF TREATING WINES AND LIQUORS BY ELECTRICITY.

No. 339,541. Patented Apr. 6, 1886.

Witnesses:
Wm Mayer
L. Powers

Inventor:
Edwin J. Fraser
By his Atty.,

UNITED STATES PATENT OFFICE.

EDWIN J. FRASER, OF SAN FRANCISCO, CALIFORNIA.

PROCESS OF TREATING WINES AND LIQUORS BY ELECTRICITY.

SPECIFICATION forming part of Letters Patent No. 339,541, dated April 6, 1886.

Application filed September 8, 1885. Serial No. 176,480. (No model.) Patented in England September 19, 1885, No. 1,153.

*To all whom it may concern:*

Be it known that I, EDWIN J. FRASER, a citizen of the United States, residing in the city and county of San Francisco, in the State of California, have invented certain new and useful Improvements in Treating Wines and Liquors with Electricity; and I do hereby declare that the following is a full, clear, and exact description of the nature of my said invention and of the manner in which I proceed to apply, use, and carry out the same in the treating of wines and alcoholic liquors.

My invention relates to improvements made in those methods, processes, and operations wherein electricity or galvanism is used for treating or working upon alcoholic liquors to age or otherwise improve them—many such methods or operations being known as "aging" methods and processes.

My improvements are based on the discovery I have made that by placing new wine or liquor within the field or influence of an electric coil, or a coil or helix formed like the helix of an electro-magnet, and connected with a battery, an electric or magnetic condition is developed and obtained in the liquid which, if continued, will in a comparatively short space of time greatly improve the qualities of the liquor.

I have termed my invention the "induction process," to distinguish it from all other methods and operations of the kind, in which the electric current or condition is produced directly by the application of electrodes or of galvanic plates and surfaces into the liquor, and such electrodes and metallic surfaces are of necessity brought and kept during the operation into actual contact with the liquid.

In carrying out and working my invention I produce an electro-magnetic helix or coil in the usual way, out of covered or insulated wire, but of much larger size than helices are generally made for electro-magnets and other purposes, in order that the space inclosed by the coil shall be of sufficient area to receive a quantity of liquid. The terminals of this coil are connected with a suitable generator of electricity—such as a cell-battery—and the liquid to be treated is confined within the field or space inclosed by the coil, either by placing a vessel or receptacle for the liquid within the coil or by introducing the coil into the vessel.

It will be found that the same conditions and action are secured whether the coil be placed around the vessel containing the liquor or whether it be immersed directly in the liquor, and therefore in the applications and uses of my invention for all purposes of treating liquids that may be found to be benefited by electricity or magnetism, I include both the placing of the electric coil or helix around the vessel or liquid-holder and the introduction of the coil directly into the liquid, employing either mode, as may be found the more convenient or suitable.

The proportions of the coil or helix for a receptacle of ten (10) gallons capacity may be taken at about eight (8) inches diameter by forty-eight (48) inches in length, insulated or covered wire about No. 17, standard gage, being used, and the coil being also covered or coated with some suitable material or composition that is impervious, and will not be attacked or acted upon by the liquid when the coil is immersed. By placing the coil outside of the vessel this coating may be dispensed with, and only the ordinary braiding or covering to separate the coils be employed. With such a helix and a "gravity" battery of one cell six by eight (6x8) inches I have worked my process and treated the above-mentioned quantity of liquor with good results.

The vessel may be made of wood in the usual way of making casks and barrels, with the coil placed in it, having the terminals *b* carried out through the head, an inlet in the top and a draw-off at the bottom being provided also for convenience of filling and emptying.

In another way, I place the liquid-holder into the space inclosed by the helix, so that the liquid is separated from the coils by the walls of the vessel. This mode of using the helix will be found particularly adapted for the lighter wines and many liquors where the covering or coating on the wire might contaminate or affect the flavor and color of the liquor being treated, and it has the advantage besides of enabling the plain braided or covered wire to be used without such coating or covering that would be required if the coil were placed in the liquor.

I have illustrated these two modes of carrying out and working the process in the accompanying drawings, wherein—

Figure 2:
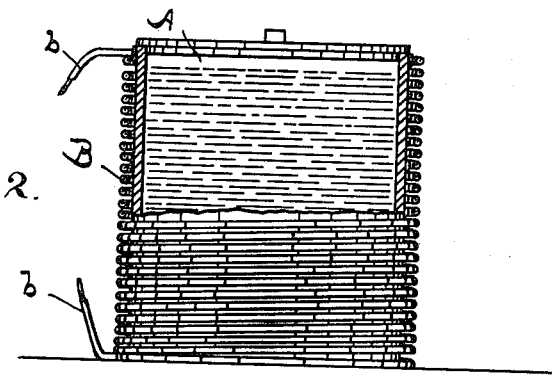

Figure 1 shows the coil placed in the liquor, and Fig. 2 the coil placed around the outside of a vessel to hold the liquor.

A represents the vessel, B the electric coil, with terminals *b b* for connecting it to the generator C, which may be a cell-battery, as shown, or any other suitable apparatus, to produce a current.

In operating upon wines and liquors, the duration of the treatment will be found to be governed by the kind of liquor taken, but from one to four weeks treatment will show excellent results, and will under ordinary conditions be the shortest and longest times for continuing the operation where claret, port, and lighter liquors, and also whisky and brandy are being worked.

Having thus fully described my invention, what I claim and desire to secure by Letters Patent, is—

1. The herein-described improvement in treating wines and liquors, which consists in placing the liquid within the field or influence of an electro-magnetic helix, substantially as set forth.

2. The herein-described method of producing an electric or magnetic state or action in a body of liquid for the purposes set forth, which consists in introducing the liquid within the field or influence of an electro-magnetic helix.

3. The method of producing and maintaining an electric or magnetic state or action in a body of liquid by induction, substantially as herein described.

EDWIN J. FRASER.

Witnesses:
EDWARD E. OSBORN,
T. W. MEAD.

It is hereby certified that in Letters Patent No. 339,541, granted April 6, 1886, upon the application of Edwin J. Fraser, of San Francisco, California, for an improvement in "Process of Treating Wines and Liquors by Electricity," errors appear requiring correction, as follows: The words "subject to the limitation prescribed by Sec. 4887, Rev. Stats., by reason of English patent dated September 19, 1885, No. 1,153," at the end of the grant and the words "Patented in England September 19, 1885, No. 1,153," at the head of the specification should be stricken out, it appearing that the English patent was not completed until June 18, 1886, which was subsequent to the issue of the United States patent, and consequently the said United States patent should not be limited thereby; and that the Letters Patent should be read with these corrections therein that the same may conform to the record of the case in the Patent Office.

Signed, countersigned and sealed this 11th day of March, A. D. 1890.

[SEAL.]

CYRUS BUSSEY,
*Assistant Secretary of the Interior.*

Countersigned:
R. J. FISHER,
*Acting Commissioner of Patents.*